United States Patent

Hreha

[11] 4,077,290
[45] Mar. 7, 1978

[54] RADIAL ARM SAW TABLE TOP

[76] Inventor: Emanuel N. Hreha, 348 E. 27th St., Erie, Pa. 16504

[21] Appl. No.: 718,054

[22] Filed: Aug. 26, 1976

Related U.S. Application Data

[63] Continuation-in-part of Ser. No. 515,351, Nov. 7, 1974, abandoned.

[51] Int. Cl.² .............................................. B23D 47/04
[52] U.S. Cl. ................................. 83/471.2; 83/467 R; 269/301; 269/319
[58] Field of Search ...................... 83/467, 468, 471.3, 83/471.2; 269/301, 319

[56] References Cited

U.S. PATENT DOCUMENTS

| 2,474,171 | 6/1949 | Swanson | 83/468 X |
| 3,196,725 | 7/1965 | Hulen | 83/467 X |
| 3,302,669 | 2/1967 | Edler | 83/471.3 |
| 3,526,397 | 9/1970 | Verguson | 269/319 X |
| 3,540,499 | 11/1970 | Sheps et al. | 83/471.3 |
| 3,554,530 | 1/1971 | Moore | 269/301 |

*Primary Examiner*—Willie G. Abercrombie
*Attorney, Agent, or Firm*—Charles L. Lovercheck

[57] ABSTRACT

A saw and a fence is disclosed. The saw may be a "radial" saw of the type supported on an arm above the table. The fence is supported in the table by means of grooves formed in the table. Each groove is open at each end of the table and the fence slides into the groove from the end. Longitudinal ribs on the fence fit into slots in the groove. A second slot receives a filler which prevents sawdust from entering the groove and the filler likewise has ribs.

1 Claim, 8 Drawing Figures

RADIAL ARM SAW TABLE TOP

REFERENCE TO PRIOR APPLICATION

This application is a continuation-in-part of patent application Ser. No. 515,351, filed Nov. 7, 1974, now abandoned.

OBJECTS OF THE INVENTION

It is an object of the invention to provide a table saw that eliminates the necessity of the usual two rear table clamps ordinarily required to support the saw fence.

Another object of the invention is to provide a saw table top with a safety feature whereby the operator need not lean over the table to loosen or tighten rear clamps, thereby preventing him from getting into the saw blade or messing up his clothes with dust.

Another object of the invention is to provide a saw table top that eliminates the necessity of moving the rear of the table top during operation, thus preventing the rear table top from getting out of level or adjustment due to sawdust getting under the table top board. This also prevents the table top from getting out of the square due to the clamps being tightened unevenly or improperly.

Another object of the invention is to provide a saw table top that eliminates the necessity of spacer boards that require the operator to lean over the table to change them.

Another object of the invention is to provide a saw table top that reduces set-up time. The table itself is assembled at the factory.

Another object of the invention is to provide a saw table top with removable rear guard fence, a removable front fence and a removable center fence, all of which can be used as options. A filler can be inserted in any one of the grooves that receive the fences.

Another object of the invention is to provide a saw table top with a fence that can be selectively inserted in any one of several grooves, the saw fence having ribs that insert with slots in the side walls of the grooves, thereby holding the saw fence positively in position.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figure 1:
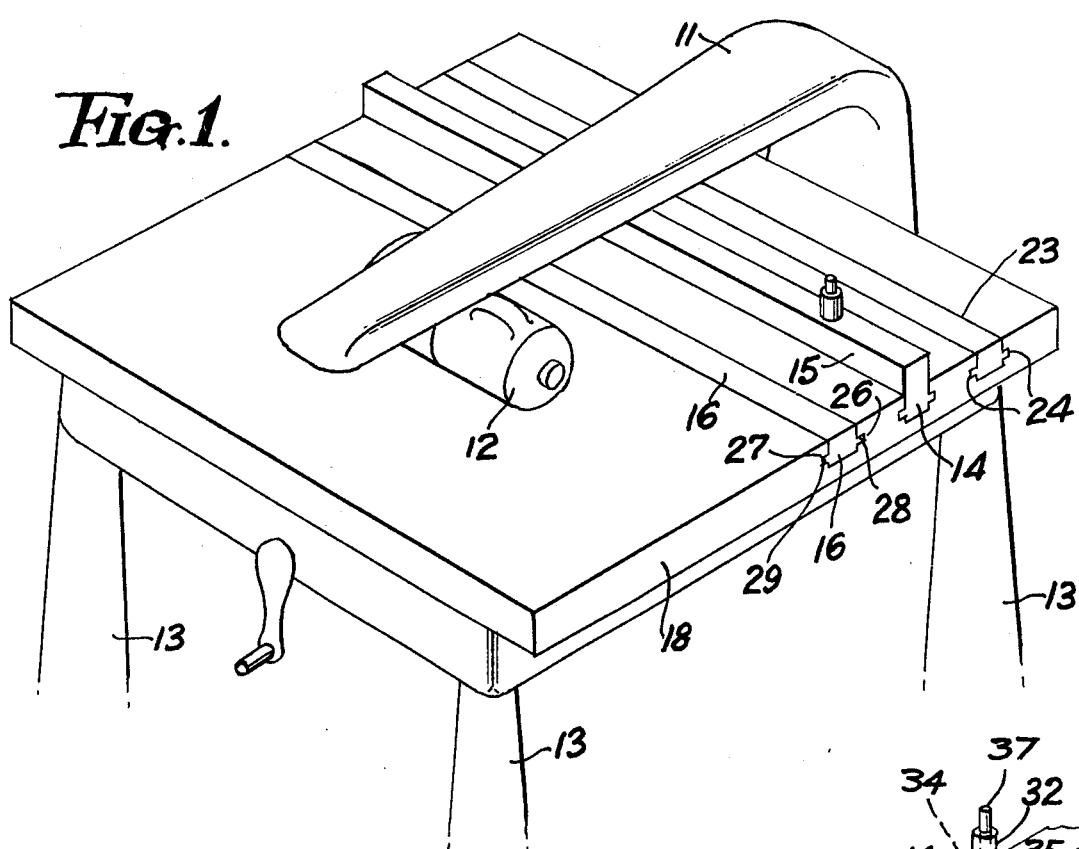
FIG. 1 is an isometric view of the saw table according to the invention.

Now, with more particular reference to the drawings, a radial type saw 10 is shown having a saw arm 11 and saw 12. The saw moves longitudinally on arm 11 in a manner familiar to those skilled in the art. The legs 13 support the table. A fence 14 is supported in groove 15 and a filler 16 is received in a second groove 17 in the table top 18. The fence 14 is generally rectangular in cross section and extends above the table 18 to a distance of about an inch. The height of the fence could obviously be any distance determined by the judgment of the manufacturer of the apparatus.

Longitudinally-extending ribs 19 and 20 are formed on the fence. Ribs 19 and 20 fit into longitudinal slots in side walls of the groove in the table. The ribs 19 and 20 are received in and are complimentary in shape to slots 21 and 22 in the table. A filler 16 is received in the second groove 17 which is identical to groove 15 and has slots 26 and 27 that receive ribs 28 and 29.

A third groove 23 is formed in the table and slots 24 are formed in the sides of groove 23. Groove 23 may receive a filler like filler 16.

A vertically-extending hole 30 in the fence 14 receives a pin 31. The pin 31 has a head 32 attached to its upper end. The lower end of the pin is received in hole 33 where it extends through the table from the bottom of slot 15. The pin 31 extends through the hole 30 in the fence into the hole 33 in the table when the fence is in operative position. The pin 31 has a cylindrical head 37 providing a limit for downward movement of the pin 31. The vertically extending hole 35 is provided in the cylindrical member 32 and the cylindrical member 32 extends into a counterbored hole in the fence 14. The hole 34 in the cylindrical member has a counterbore 35 which receives the head 37 of the pin 31 whereby the head limits the downward movement of the pin 31. Thus, the pin 31 holds the fence firmly in position. In the other embodiments, holes 130, 230, 330, 430 and 530 are formed in the surface 116, 216, 316, 416 and 516 respectively. These holes can receive a pin 35 which extends through the spacers and the holes 133, 233, 333, 433 and 533 respectively in the table. The pins 35 in these holes can have a head which will not interfere with work sliding over the top of the table and they can have a counterbore to receive their heads. Spacer members 16, 116, 216, 316, 416 and 516 each have a counterbore 34, 134, 234, 334, 434 and 534 respectively adapted to receive the head of the pin. When fence 14 is received in any of the grooves in the table top, the pin 31 will register with the particular hole 133, 233, 333, 433 or 533 respectively.

Fence 14 can be moved to either of slots 15, 17 or 23 and a filler 16 can be substituted for fence 14 in any of the grooves. The fillers provide a smooth table top and keep sawdust out of grooves not occupied by a fence.

Figure 2:
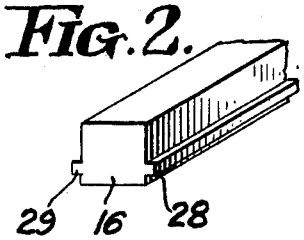
FIG. 2 is an enlarged view of the saw table and fence according to the invention.
Figure 3:
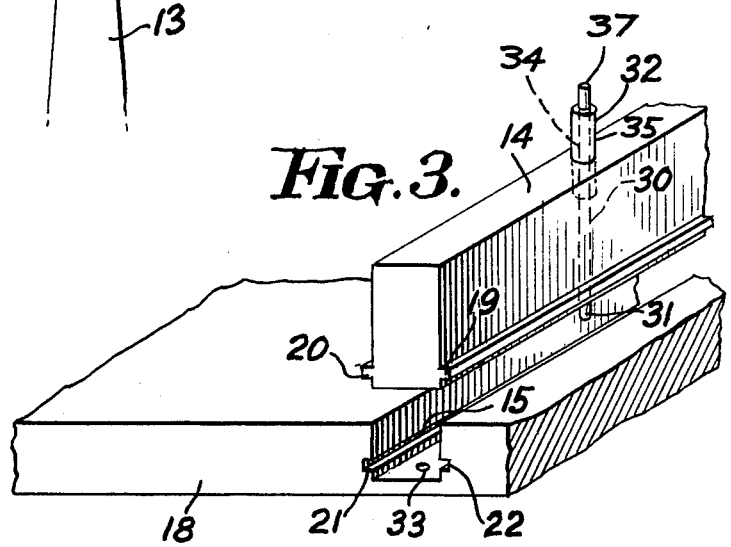
FIG. 3 is an enlarged view of one of the fillers.
Figure 4:
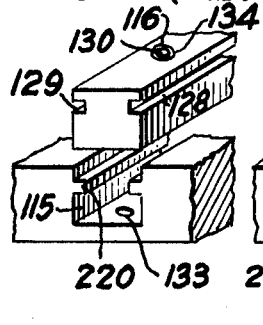
FIGS. 4 through 8 show partial views of other embodiments of the invention.

In the embodiment of the invention shown in FIG. 4, a different embodiment of the spacer is shown. The spacer could be made in the form of the fence 14 in FIGS. 1 and 2. The spacer 116 has longitudinally-extending grooves 128 and 129 that receive the ribs 121 and 122 when the spacer 116 is inserted in the groove 115.

Figures 5, 6:
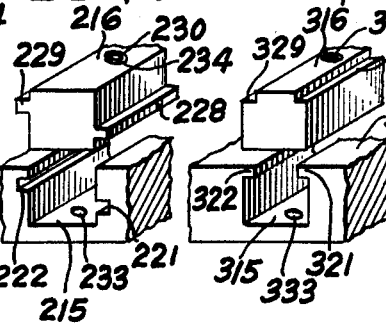

In the embodiment of the invention shown in FIG. 5, the spacer 216 is adapted to be received in the groove 215 which has slots 221 and 222 extending axially along each side of the groove. These slots receive the ribs 228 and 229 in the spacer 216.

In the embodiment of the invention shown in FIG. 6, the table 318 has a groove 315 which is open at its end and which has the overlying shoulders 321 and 322 that are received in the offsets 328 and 329 in the spacer.

Figure 7:
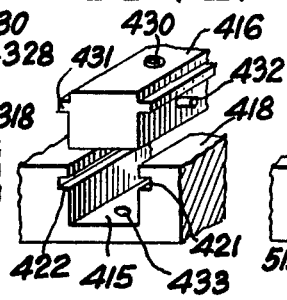

In the embodiment of the invention shown in FIG. 7, the table 418 has a groove 415 in it which has slots 421 and 422 which receive the dowels 428 which are disposed in spaced relation along the sides of the spacer 416.

Figure 8:
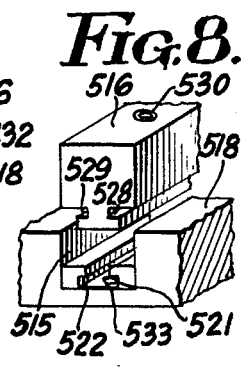

In the embodiment of the invention shown in FIG. 8, a groove 515 is formed in the table top with spaces 521 and 522 underlying the shoulders shown. A guide or stop 516 has a T-shaped head extending downward from it with flanges that fit under shoulders 521 and 522 holding the guide or stop rigidly in position in the groove 515.

The foregoing specification sets forth the invention in its preferred practical forms but the structure shown is capable of modification within a range of equivalents withoug departing from the invention which is to be understood is broadly novel as is commensurate with the appended claims.

The embodiments of the invention in which an exclusive property or privilege is claimed are defined as follows:

1. In combination, a table saw having a table and a fence comprising,
   - a flat topped table having a first end and a second end,
   - a saw supported over said table to move longitudinally thereof,
   - a rectangular, laterally-extending groove in said table, extending from said first end thereof to the said second end,
   - said groove having a bottom and two side walls and a longitudinally-extending slot in each of the side walls spaced from said bottom defining said groove,
   - a fence,
   - said fence being generally rectangular in cross section and having a width substantially equal to the width of said slot,
   - a vertically-extending hole is said fence,
   - a vertically-extending hole is said table registering with said hole in said fence, and
   - a pin extending through said hole in said fence into said hole in said table,
   - said pin having a cylindrical head providing a limit for downward movement of said pin,
   - a said vertically-extending hole is provided in said cylindrical head identical in shape and position to said hole in said fence,
   - said hole in said cylindrical member having a counterbore in said cylindrical member adjacent the upper end of said hole,
   - said pin having a head adapted to be received in said counterbore and to extend downwardly into said hole in said table with the head of said pin being received in said counterbore flush with the top of said fence whereby said head will not interfere with work sliding over the top of said table.

* * * * *